(No Model.)
D. A. BROWN.
CARRIAGE AXLE.
No. 325,050. Patented Aug. 25, 1885.
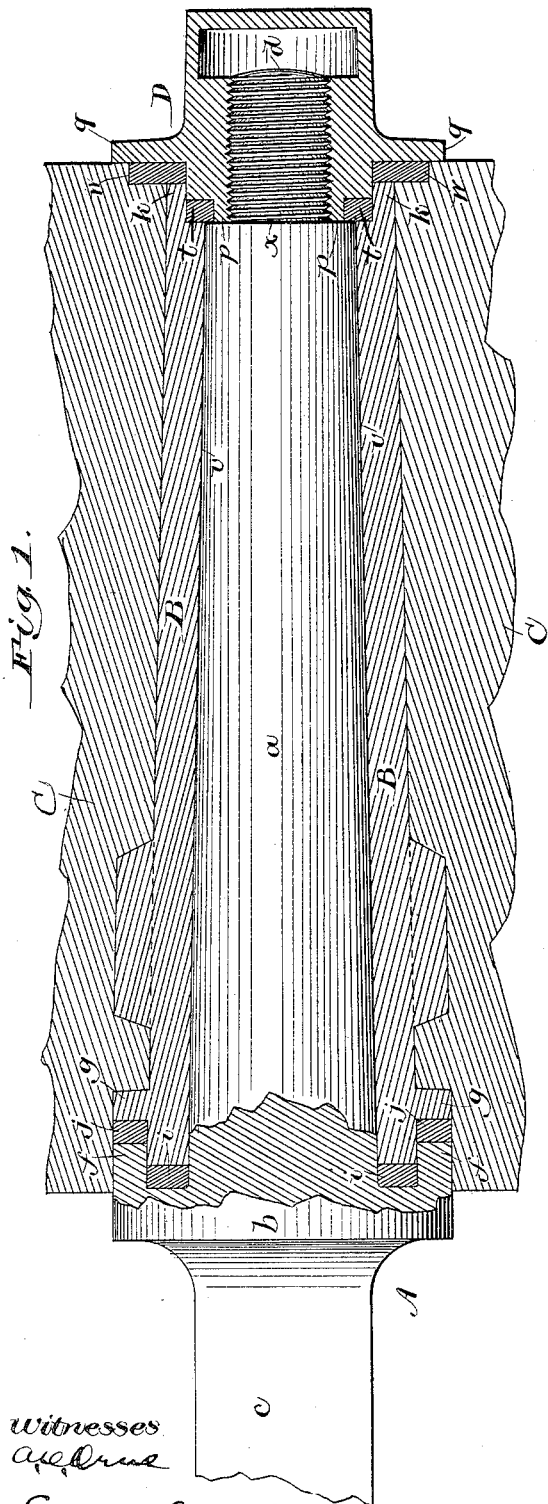
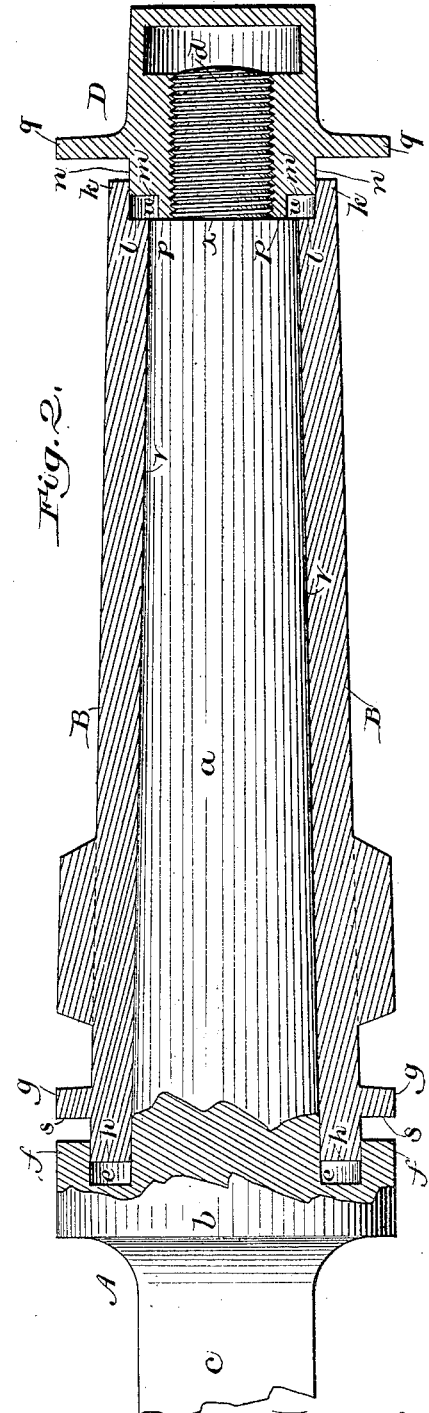
Witnesses
Inventor
D. Arthur Brown
per T. W. Porter, Atty.

UNITED STATES PATENT OFFICE.

D. ARTHUR BROWN, OF CONCORD, NEW HAMPSHIRE.

CARRIAGE-AXLE.

SPECIFICATION forming part of Letters Patent No. 325,050, dated August 25, 1885.

Application filed May 21, 1885. (No model.)

*To all whom it may concern:*

Be it known that I, D. ARTHUR BROWN, of Concord, in the county of Merrimac and State of New Hampshire, have invented a new and useful Improvement in Carriage-Axles, which will, in connection with the accompanying drawings, be hereinafter fully described, and specifically defined in the appended claims.

This invention has for its object certain improvements in carriage-axles, as will, in connection with the accompanying drawings, be hereinafter fully described and particularly claimed.

In said drawings, Figure 1 is a longitudinal section through the box and portion of the arm of my improved axle, a portion of the hub being also shown in section. Fig. 2 is a section like Fig. 1, except that the hub and packing-rings shown in Fig. 1 are omitted in order the more clearly to mark the respective parts.

In said views, A represents the axle, B the box, and C the hub, in which the box is inserted, as shown. The axle has the usual arm, $a$, solid concentric collar $b$, bed $c$, and reduced end or stem $d$, on which the nut D is threaded. Collar $b$ has formed within it the concentric groove or chamber $e$, corresponding in its exterior and interior diameter with the corresponding dimensions of box B, so as to receive the end thereof, the diameter of collar $b$ being such as to leave an overhanging concentric lip, $f$, outside chamber $e$, of a thickness equal or approximating to that of the shell of box B.

Upon the inner end of box B is formed a collar, $g$, whose inner face, $s$, is at the same distance from end $h$ of the box as the depth of chamber $e$, so that when the packing-ring $i$ is seated in the bottom of chamber $e$, and ring $j$ is mounted on the box between collar $g$ and the abutting face of lip $f$, (the rings being of equal thickness,) the pressure and wear thereon will be equal.

At the opposite or outer end the box is chambered or enlarged in its bore to form a shoulder, $l$, leaving a concentric lip, $k$, surrounding such enlargement, the cylindrical or sleeve-like portion $n$ of the nut projecting inward from its concentric flange $q$, being of a diameter to closely fit the interior diameter of lip $k$. Said portion $n$ near its inner end is reduced to form a shoulder, $m$, and a short sleeve-like portion, $p$. The diameter of sleeve $p$ is as much less than the diameter of the axle as is the interior diameter of lip $k$ greater than the diameter of the axle; hence the packing-ring $t$, when inserted in the concentric cavity $u$, will extend about an equal distance inwardly and outwardly from the meeting line $v$ of the box and axle. The flange $q$ of the nut is arranged at such distance from the inner face of portion $p$ that when the latter bears against the shoulder of the axle the inner face of said flange will be at such distance from the end face of lip $k$ as to leave room for the ring-packing $w$ between the flange and lip, as shown.

As it is of prime importance to the satisfactory working of carriage-axles that dust and other grit shall be excluded, and that the lubricant employed shall be kept within the box as long as possible, and, further, that all the means for accomplishing these results must be embodied in the axle box and nut, as no extraneous devices can be employed, therefore the double packing at each end of the box and axle-arm—which by my construction of these parts is made feasible—is of great utility, as the movement of grit inward or of oil outward must not only pass the double packing, but in so doing must at either end of the arm and box change direction at least four times—a circuity of movement that must greatly retard, if it does not absolutely prevent, the necessarily slow movement of such bodies as oil or the gritty substances that tend to enter and injure the box and adjacent wearing-surfaces.

It will be obvious that if the box B is made of a length between its shoulders $h\,l$ equal to the length of axle-arm $a$ between its shoulders $x$ and the bottom of chamber $e$, and the short sleeve $p$ of the nut were omitted, the respective abutting faces of the box, axle, and nut would be in contact, in which case the respective packing-rings would be omitted, as is sometimes practiced in the larger sizes of axles for heavy work.

I claim as my invention—

1. As an improvement in axles, the box B, formed with an interior shoulder, $l$, and lip $k$, and nut D, formed with flange $q$ and differential sleeves $n$ $p$, substantially as specified.

2. The combination, with axle A, box B, formed at its outer end with internal shoulder, $l$, and projecting lip $k$, and nut D, formed with flange $q$ and sleeves $n$ $p$, of packing-rings $t$ $w$, arranged relatively to the axle, box, and nut as specified.

D. ARTHUR BROWN.

Witnesses:
EUGENE HUMPHREY,
A. O. OWEN.